(12) United States Patent
Arbona et al.

(10) Patent No.: US 7,578,133 B2
(45) Date of Patent: Aug. 25, 2009

(54) REDUCED RADAR CROSS SECTION EXHAUST NOZZLE ASSEMBLY

(75) Inventors: Jaime A. Arbona, Boqueron, PR (US); Meggan Harris, Colchester, CT (US); James Allore, Trinity, FL (US); Steven Laporte, Southwick, MA (US)

(73) Assignee: United Technologies Corporation, Hartford, CT (US)

( * ) Notice: Subject to any disclaimer, the term of this patent is extended or adjusted under 35 U.S.C. 154(b) by 712 days.

(21) Appl. No.: 11/091,120

(22) Filed: Mar. 28, 2005

(65) Prior Publication Data

US 2006/0213198 A1 Sep. 28, 2006

(51) Int. Cl.
*F02K 1/00* (2006.01)

(52) U.S. Cl. .................. 60/771; 60/770; 239/265.39; 239/265.19

(58) Field of Classification Search .................. 60/770, 60/771; 239/265.19, 265.39, 265.11
See application file for complete search history.

(56) References Cited

U.S. PATENT DOCUMENTS

| | | | | |
|---|---|---|---|---|
| 4,128,208 A | | 12/1978 | Ryan et al. | |
| 5,115,979 A | * | 5/1992 | Ellerhorst et al. | 239/265.37 |
| 5,485,959 A | * | 1/1996 | Wood et al. | 239/265.41 |
| 5,680,755 A | * | 10/1997 | Hauer et al. | 60/266 |
| 5,713,522 A | | 2/1998 | Lundberg | |
| 5,833,139 A | | 11/1998 | Sondee et al. | |
| 5,839,663 A | | 11/1998 | Broadway et al. | |
| 5,893,518 A | * | 4/1999 | Bruchez et al. | 239/265.39 |
| 7,240,493 B2 | * | 7/2007 | Seiner | 60/770 |
| 2005/0235628 A1 | * | 10/2005 | Senile | 60/266 |

\* cited by examiner

*Primary Examiner*—Michael Cuff
*Assistant Examiner*—Phutthiwat Wongwian
(74) *Attorney, Agent, or Firm*—Carlson, Gaskey & Olds

(57) ABSTRACT

An exhaust nozzle assembly includes a plurality of interfitting flap assemblies that are moveable between a maximum area ratio and a minimum area ratio. Each of the pluralities of flap assemblies includes a slot and a wing. The wing fits within an adjacent slot of an adjacent flap assembly. Each of the flap assemblies includes a divergent element that provides a specific geometric shape forming the trailing edge surfaces. The flap element is attached to the divergent element and extends to a static structure. The flap element and the divergent element combine to form a continuous faceted outer surface of the exhaust nozzle assembly substantially void of gaps throughout the range of motion between the maximum and minimum area ratios.

17 Claims, 5 Drawing Sheets

REDUCED RADAR CROSS SECTION EXHAUST NOZZLE ASSEMBLY

The US Government may have certain rights in this invention in accordance with Contract Number N00019-02-C-2003 awarded by the United States Navy.

BACKGROUND OF THE INVENTION

This invention relates generally to an exhaust nozzle assembly for a gas turbine engine. More particularly this invention relates to interfitting flap assemblies for a variable exhaust nozzle assembly.

An exhaust nozzle for a gas turbine engine accelerates gas flow exiting the engine increasing thrust. A fixed exhaust nozzle including a fixed exhaust opening provides optimal performance for a single operating condition. A variable exhaust nozzle opens and closes to provide differing opening sizes to optimize performance for many operating conditions. Such exhaust nozzles typically include a plurality of flap sections moveable radially to change the opening area of the exhaust nozzle.

Typically, a seal is provided on a hot side of the flaps for blocking a portion of a gap created between adjacent flaps during movement of the exhaust nozzle assembly. Disadvantageously, such seals cannot block or control all gaps created between adjacent flap assemblies during movement of the exhaust nozzle assembly.

Accordingly, it is desirable to design and develop a variable exhaust nozzle assembly that minimizes gaps throughout all positions of the exhaust nozzle assembly.

SUMMARY OF THE INVENTION

This invention is an exhaust nozzle assembly including a plurality of interfitting flap assemblies having a wing portion and a slot portion. The wing portion of one flap fits within a slot portion of an adjacent flap to minimize and control formation of gaps between each of the flap assemblies.

The exhaust nozzle assembly includes a plurality of interfitting flap assemblies defining a variable cross-section opening. Pivoting of the flap assemblies about a fixed pivot varies the cross-sectional area of the opening. Each of the flap assemblies includes a divergent element, a flap element, and a seal. The seal is disposed between adjacent flap assemblies on an interior surface of the exhaust assembly to block gaps between adjacent flap assemblies. Each of the flap assemblies interfits into an adjacent flap assembly to provide a substantially uniform and continuous, faceted outer surface of the exhaust nozzle assembly.

Each of the seals includes a tented portion extending rearward from a trailing edge. The trailing edge of the seal includes a notch. The tented portion is disposed along a plane different than the substantial planar surface of the remaining portions of the seal. The tented portion is bent outwardly away from the interior surface of the flap assemblies. The notched and tented portions are disposed substantially at the trailing edge of the exhaust nozzle assembly to reduce and control formation of gaps between adjacent flap assemblies during articulation.

Accordingly, the exhaust nozzle assembly of this invention provides an improved flap assembly that reduces and controls gaps generated during articulation of a variable exhaust nozzle assembly.

These and other features of the present invention can be best understood from the following specification and drawings, the following of which is a brief description.

DETAILED DESCRIPTION OF THE PREFERRED EMBODIMENT

Figure 1:
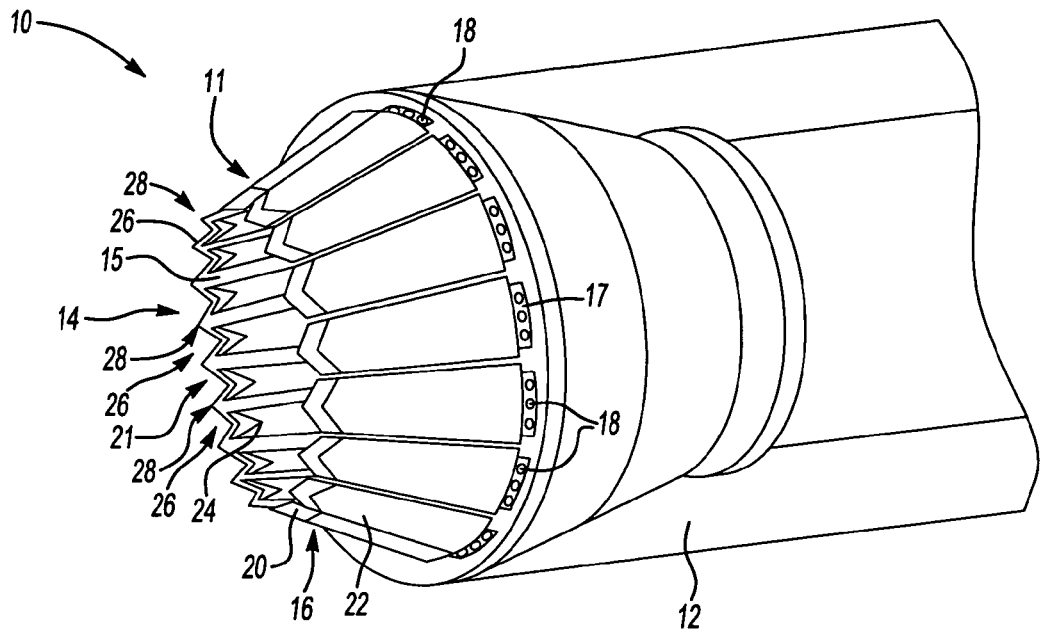
FIG. 1 is a perspective view of an exhaust nozzle assembly for a gas turbine engine.

Referring to FIG. 1, an exhaust nozzle assembly 10 includes a plurality of interfitting flap assemblies 16 defining an opening 14. Each of the flap assemblies 16 is pivotally attached to a static structure at pivots 18. An actuator illustrated schematically at 17 is attached to move each of the flap assemblies 16. Pivoting of the flap assemblies 16 varies the cross-sectional area of the opening 14.

Each of the flap assemblies 16 includes a divergent element 20, a flap element 22, and a seal 24. The seal 24 is disposed between adjacent flap assemblies 16 on an interior surface 15 of the exhaust nozzle assembly 10 to substantially prevent leakage of exhaust gasses therethrough. Each of the flap assemblies 16 interfits into an adjacent flap assembly 16 to provide a substantially uniform and continuous, faceted outer surface 11 of the exhaust nozzle assembly 10. The opening 14 includes a serrated trailing edge 21 defined by the divergent elements 20 of each flap assembly 16. The serrated trailing edge 21 includes a plurality of aft most portions 28 and trailing edge surfaces 26 defined by the divergent elements 20. The aft most portions 28 alternate with the trailing edge surfaces 26 creating the trailing edge 21 having a plurality of peaks and valleys.

Figure 2:
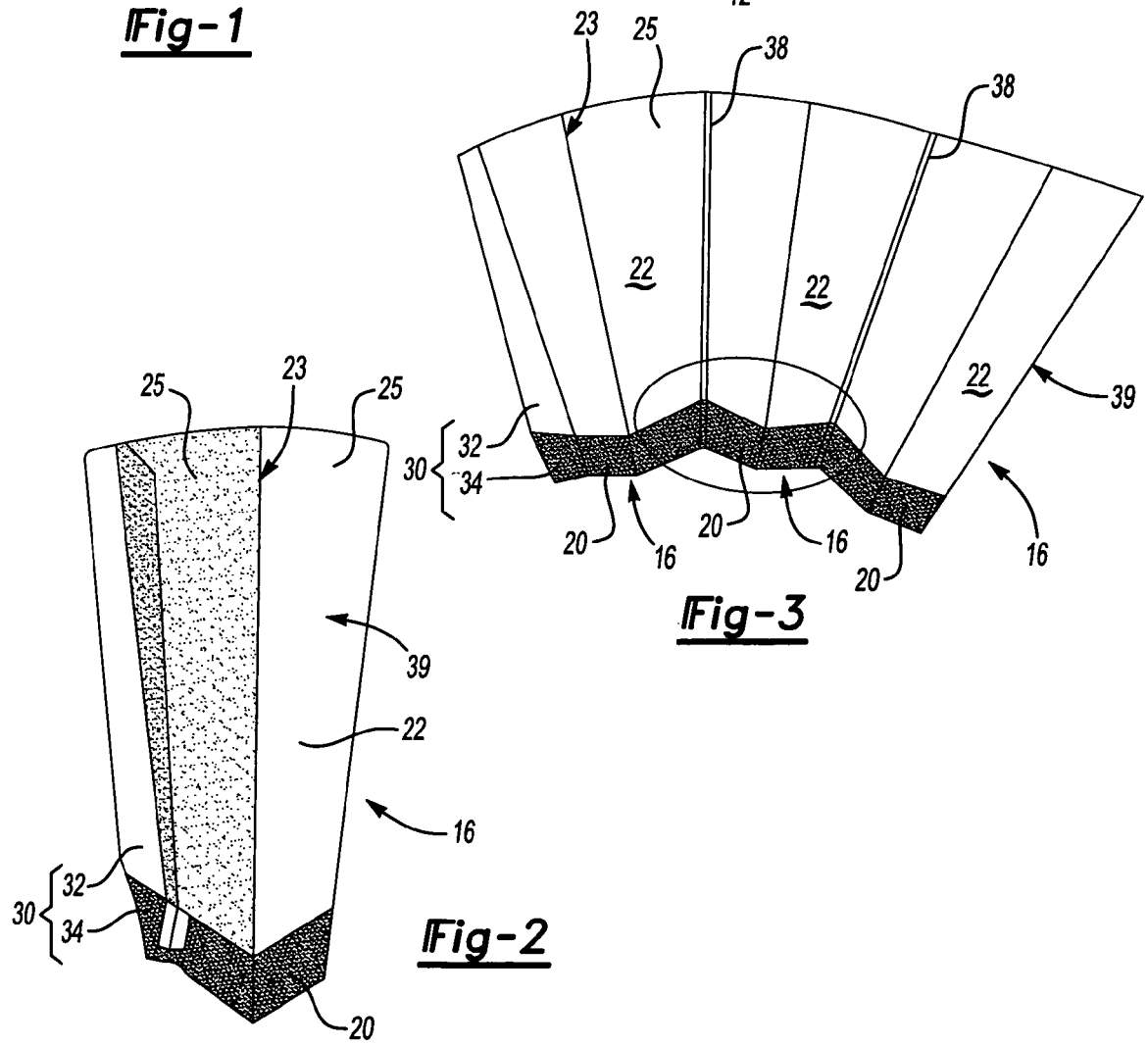
FIG. 2 is a plan view of a flap assembly according to this invention.

Referring to FIG. 2, each of the flap assemblies 16 includes the flap element 22 that is attached to the divergent element 20. The divergent element 20 includes a wing segment 32 and the flap element 22 also includes a wing segment 34. The wing segments 32, 34 combine to form a common wing 30. The wing 30 extends from one side of the flap element 22 and a slot 39 is provided within each flap assembly 16 on a side opposite the wing 30.

Each flap assembly 16 defines a portion of the outer surface 11 and includes a crest 23 between tapered surfaces 25. The tapered surface 25 gradually transition upward toward the crest 23. The wing 30 is disposed on a separate plane below the tapered surface 25 of each flap assembly 16.

Figure 3:
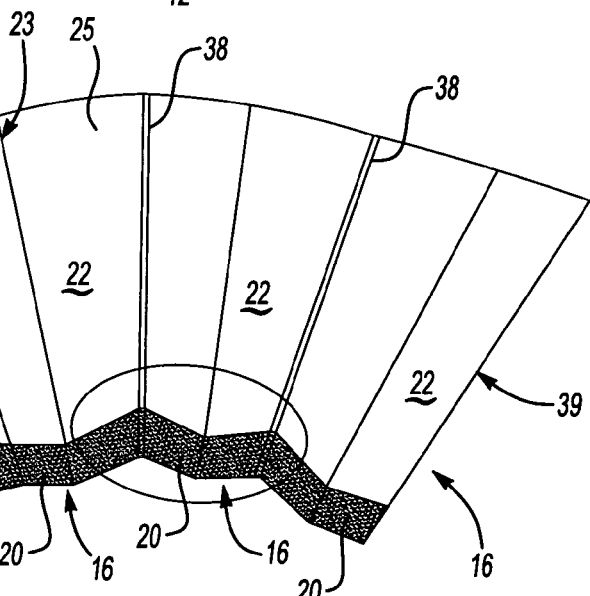
FIG. 3 is a plan view of several flap assemblies interfit with one another.

Referring to FIG. 3, several flap assemblies 16 are shown interfit with each other. Each wing 30 fits within the slot 39 of an adjacent flap assembly 16. As the nozzle opening 14 expands and contracts, the wing 30 moves progressively into and out of the slot 39 formed in an adjacent flap assembly 16 such that no gap is formed therebetween. An interface 38 between adjacent flap assemblies 16 moves along the wing 30 during expansion. During contraction the interface 38 is at a position such that the tapered surfaces 25 of adjacent flap assemblies 16 abut to form the faceted outer surface 11. The interface 38 between each flap assembly 16 moves, but is always covered by the wing 30 to provide the substantially continuous and uninterrupted faceted outer surface 11. Although the interface 38 forms a visible seam between adjacent flap assemblies 16, there are no gaps exposed along adjoining flap assemblies 16 through the full range of motion of each of the plurality of flap assemblies 16.

Figure 4:
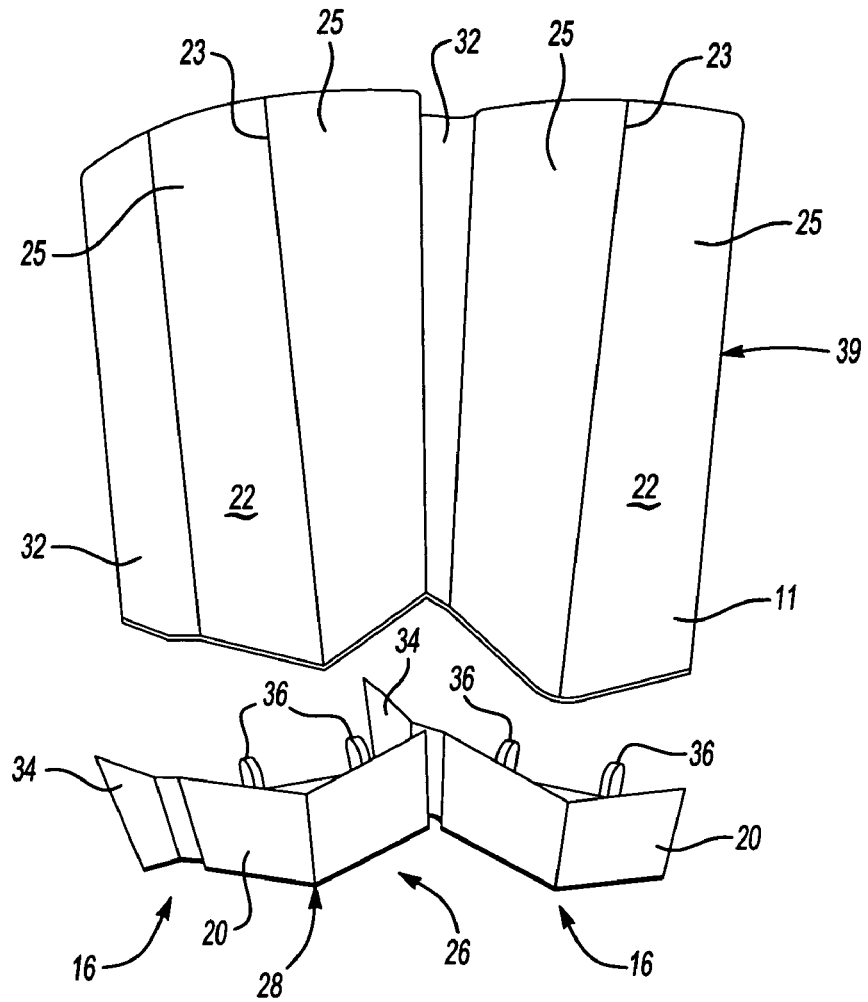
FIG. 4 is an exploded view of two flap assemblies according to this invention.

Referring to FIG. 4, each of the flap assemblies 16 includes the divergent element 20 and the flap element 22. The flap element 22 includes the crest 23 and the tapered surfaces 25 to form a portion of the outer surface 11. The flap element 22 is attached by way of the pivot 18 to a static structure of the engine 12 at one end and to the divergent element 20 on an end opposite the pivot 18. Attachment of the flap element 22 to the divergent element 20 is as known and can include welding or the use of mechanical fasteners.

The divergent element 20 includes the wing segment 34 that interfits within an adjacent divergent element 20. The divergent element 20 defines the trailing edge surface 26 that is angled outwardly towards the aft point 28. Each divergent element 20 includes bosses 36 for attaching to articulating mechanisms of the actuator 17 (FIG. 1) utilized for actuating the flap assemblies 16.

Figure 5:
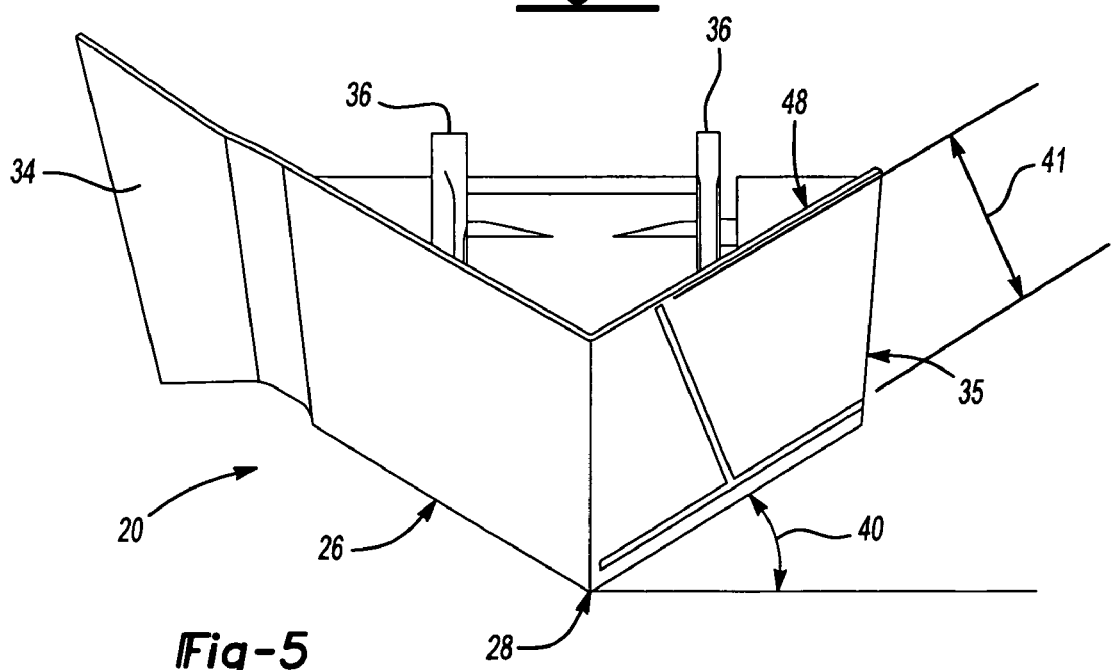
FIG. 5 is a top view of a divergent element.

Referring to FIG. 5, the divergent element 20 is shown and is formed to include a desired geometric shape that combines with adjacent divergent elements 20 to define the serrated trailing edge 21 for the exhaust nozzle assembly 10. The divergent element 20 includes a sweep angle 40 and a plane length 41. The plane length 41 in conjunction with the sweep angle 40 combined with adjacent divergent elements 20 provides desired performance characteristics and minimizes and controls the formation of gaps in the trailing edge 21.

The example divergent element 20 is a single cast piece. The material that is utilized to fabricate the divergent element 20 is compatible with the temperatures and the chemical composition of the exhaust gasses that are emitted from the gas turbine engine through the exhaust nozzle assembly 10. Although, the example divergent element 20 is a cast piece, a worker skilled in the art with the benefit of this disclosure would understand that the divergent element 20 may be fabricated utilizing other known manufacturing processes.

The wing segment 34 of the divergent element 20 deviates from the overall shape of the divergent element 20 and extends rearward of the trailing edge surface 26. The wing segment 34 is shaped to interfit within an adjacent divergent element 20 such that when the exhaust nozzle assembly 10 is at its maximum opening, the wing segment 34 will remain within a slot 35 of an adjacent divergent element 20 thereby providing the substantially continuous outer surface 11 between adjacent flap assemblies 16.

Figure 6:
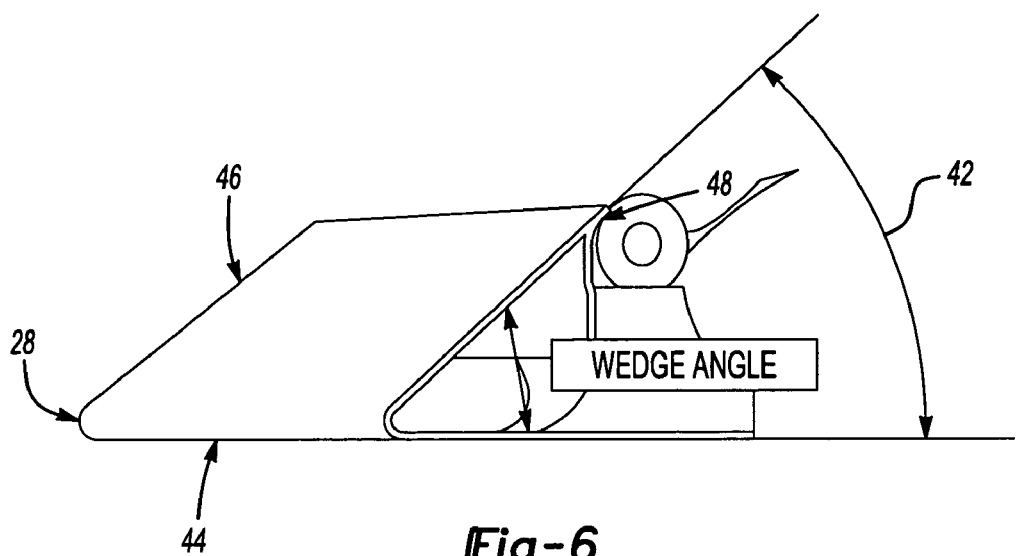
FIG. 6 is a side view of the divergent element shown in FIG. 5.

Referring to FIG. 6, the divergent element 20 is shown in a side view to illustrate the wedge surface 46 and the wedge angle 42. The sweep angle 40 and wedge angle 42 along with the surface wedge 46 and length 41 act in concert to provide desired operating characteristics and the desired serrated trailing edge 21.

Figure 7:
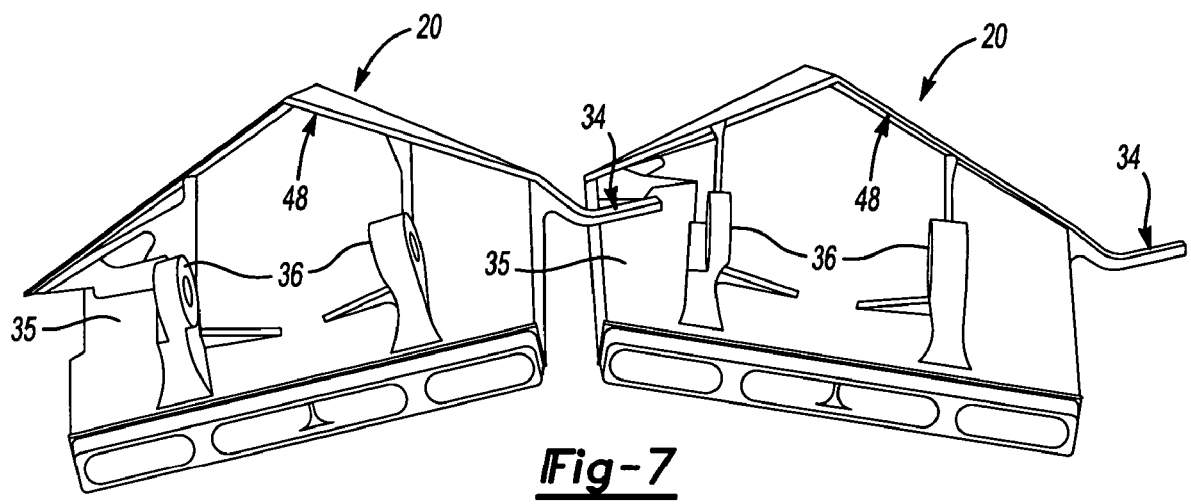
FIG. 7 is a rear perspective view of two divergent elements interfit into one another.

Referring to FIG. 7, two divergent elements 20 are shown from a rear view with the flap element 22 omitted for clarity. The wing segment 34 of one divergent element 20 is disposed within the slot 35 of the adjacent divergent element 20. The divergent elements 20 include a lip portion 48 that is provided to conform to assembly of the flap element 22. The lip portion 48 accommodates the configuration of the flap element 22 to provide a substantially continuous outer surface of the flap assembly 16.

Figure 8:
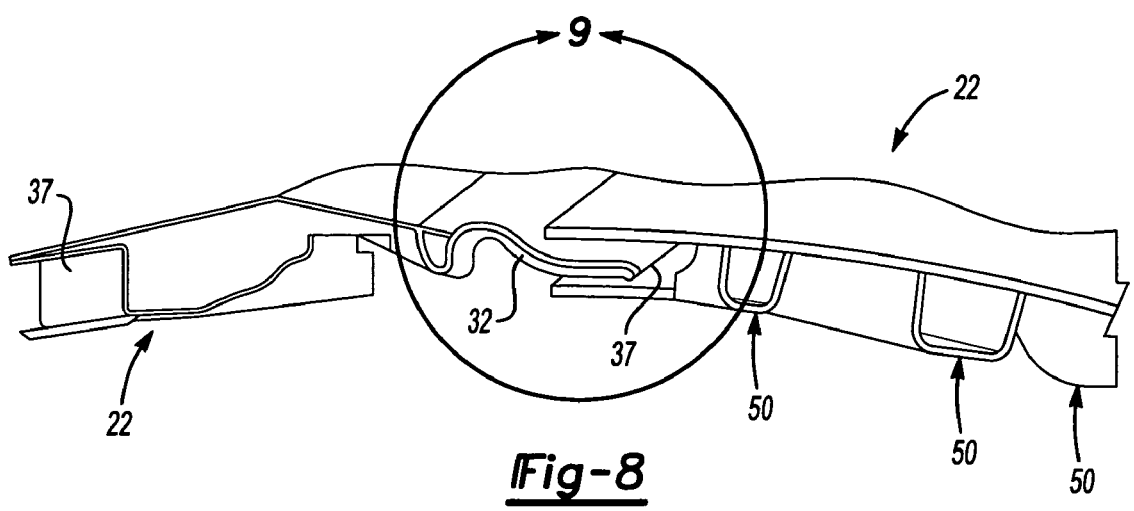
FIG. 8 is a rear cross sectional view of two-flap elements interfit into one another.

The wing segment 34 fits within the accompanying slot 35 of the adjacent divergent element 20; however, the wing segment 34 does not contact the adjacent divergent element 20 during movement. Instead the wing segment 34 moves within the slot 35 of the adjacent divergent element 20. Because there is no contact between the wing segment 34 and the adjacent divergent element 20, undesirable wear and friction between adjacent divergent elements 20 are substantially eliminated. Referring to FIG. 8, a cross-section of adjacent flap elements 22 is shown to illustrate the relationship between the wing segment 32 and the slot 37. As in the divergent element 20, the wing segment 32 of the flap element 22 is disposed within a slot 37 of an adjacent flap element 22. The wing segment 32 does not contact any portion or surface of the adjacent flap element 22. Interfitting wings 30 of each flap assembly 16 produces the continuous outer surface 11 of the exhaust nozzle assembly 10.

Each of the flap elements 22 includes ribbed portions 50. The ribbed portions 50 strengthen the flap elements 22 and provide for the inclusion of cooling features or articulation features that are utilized to move each of the flap assemblies 16.

Figure 9:
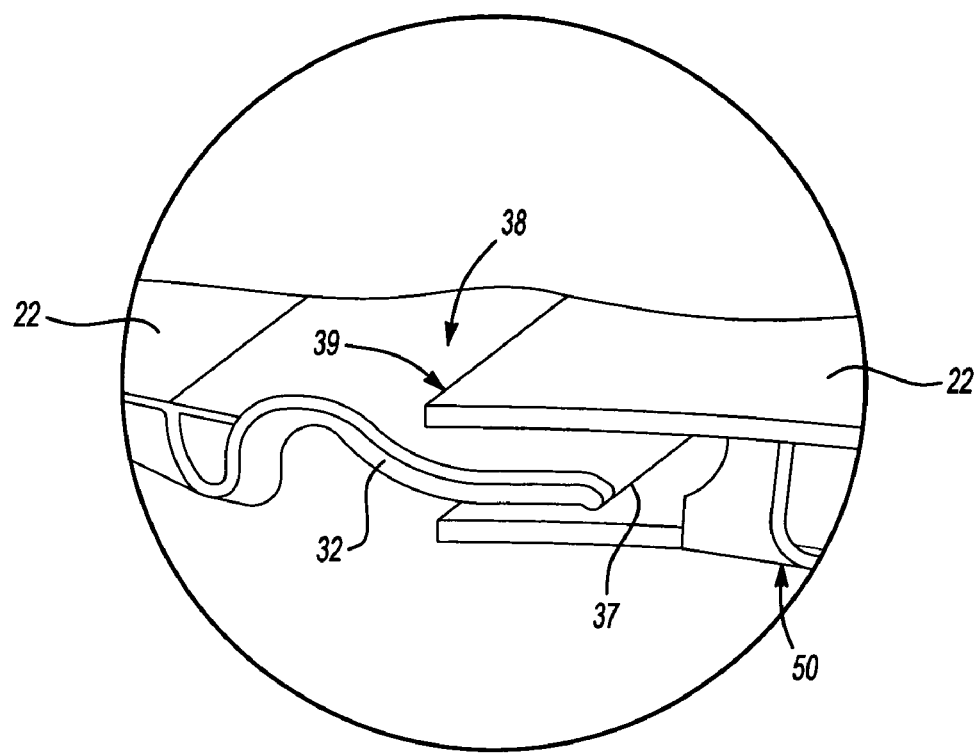
FIG. 9 is an enlarged view of the interface between two flap elements.

Referring to FIG. 9, an enlarged view of the interface 38 between the flap assemblies 16 is shown at the intersection between adjacent flap elements 22. The wing segment 32 of each flap element 22 fits within the slotted portion 37 of the adjacent flap element 22. The wing segment 32 recedes within the slot 37 of the adjacent flap element 22 during articulation and movement of each of the flap assemblies 16. Because the wing segment 32 does not contact the adjacent flap element 22 frictional forces are not introduced, however, the gaps between adjacent flap assemblies 16 are substantially eliminated providing the desirable continuous surface of the exhaust nozzle assembly 10.

Figure 10:
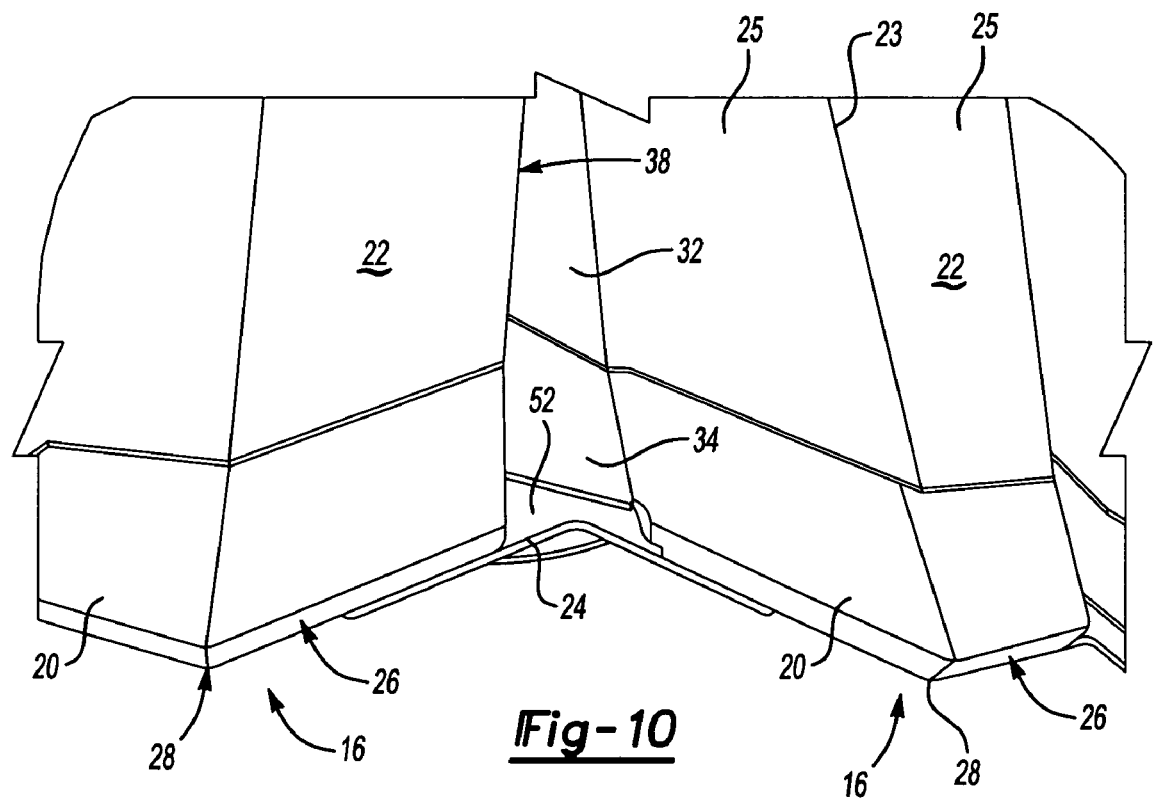
FIG. 10 is a perspective view of interfit flap assemblies viewed from the trailing edge.

Referring to FIG. 10, two adjacent flap assemblies 16 are shown in a view looking toward the trailing edge surface 26. The flap element 22 is attached to the divergent element 20 such that the two form a substantially continuous exterior surface. The flap element 22 and the divergent element 20 of the illustrated example are formed as a single composite piece. The material utilized can be of any material compatible with the environmental conditions experienced by the exhaust nozzle assembly 10. A worker skilled in the art with the benefit of this disclosure would understand what types of materials and processes are required to fabricate elements consistent and compatible with operation in the extreme conditions of the exhaust nozzle assembly.

The interface between adjacent flap assemblies 16 may result in a gap 52 along the trailing edge 21 for some exhaust nozzle openings. The gap 52 is minimized by geometric configuration of the wings 30 of the flap assemblies 16 and the fit between adjacent divergent elements 20. Further, the seal 24 is disposed on the interior surface 15 between adjacent flap assemblies 16 for covering the gap 52. The seal 24 is comprised of sheet metal that is attached to move and maintain a position relative to the flap assemblies 16 through the range of motion.

Figure 11:
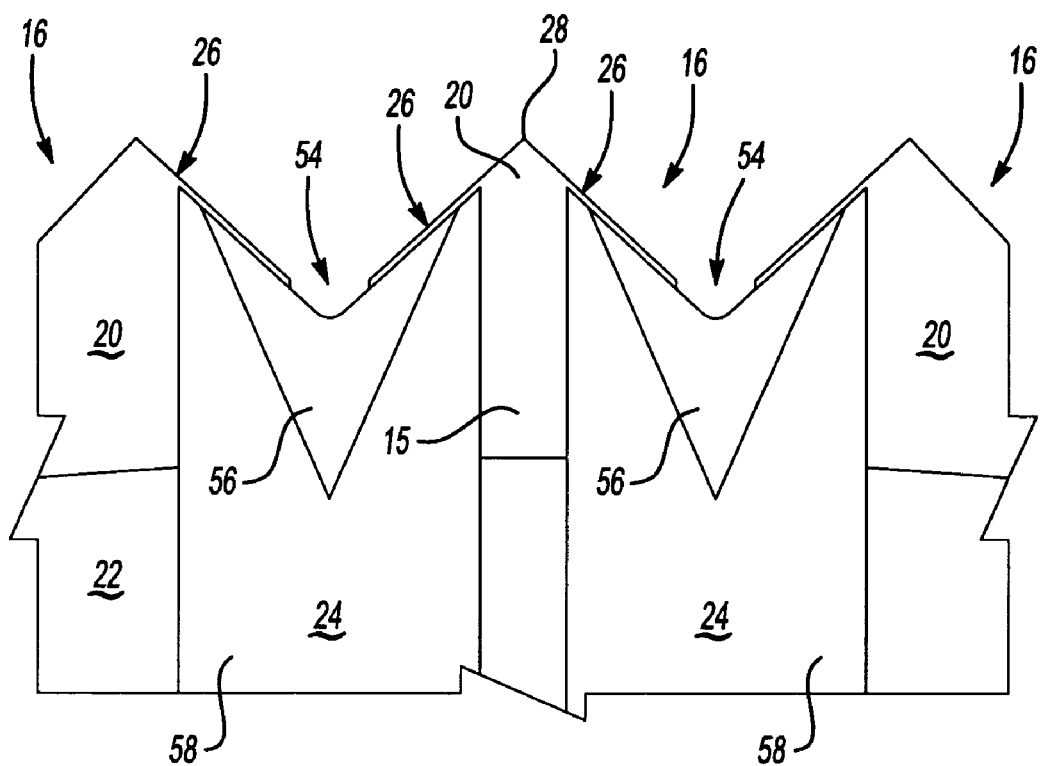
FIG. 11 is a plane view of an interior surface of adjacent flap assemblies including a seal.
Figure 12:
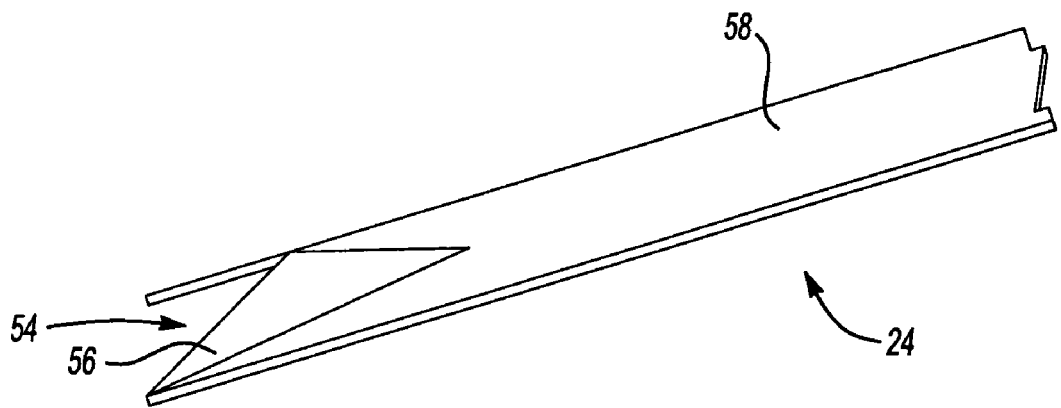
FIG. 12 is a perspective view of the seal.

Referring to FIG. 11, the seal 24 disposed on the interior surface 15 of each of the flap assemblies 16 is shown. The seal 24 includes a notch 54. The notch 54 conforms to the geometry of adjacent divergent elements 20 such that a portion of the seal 24 can be positioned further towards the trailing edge 21. Each of the seals 24 includes a tented portion 56. The tented portion 56 is rearward of the notch 54 along a plane different than the substantial planar surface 58 of the remaining portions of the seal 24. The tented portion 56 is bent outwardly away from the interior surface 15 of the flap assemblies 16. This provides the flexibility of the seal 24 to not only block gaps produced during articulation of the exhaust nozzle assembly 10, but also provides a desired geometry for reducing and substantially eliminating potential gaps through trailing edge 21 resulting from articulation of adjacent flap assemblies 16.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An exhaust nozzle assembly comprising:
a plurality of interfitting flap assemblies movable between a maximum area position and a minimum area position, each of said plurality of flap assemblies including a slot on one longitudinal side and a wing on a second longitudinal side, said wing fitting within a slot of an adjacent one of said plurality of interfitting flap assemblies, wherein each of said plurality of flap assemblies includes a divergent element attached to a flap element, said divergent element and said flap element include a portion of said wing, and said divergent element defines a trailing edge including an aft most portion, sweep surfaces extending from said aft most portion at a sweep angle and a top surface extending upwardly from said aft most portion at a wedge angle.

2. The assembly as recited in claim 1, including a seal disposed between adjacent flap assemblies.

3. The assembly as recited in claim 1, wherein said divergent element includes a slot side and a wing side, wherein said slot slide is configured for receiving a wing side of an adjacent divergent element.

4. The assembly as recited in claim 1, wherein said divergent element includes an attachment segment for connection to a linkage element.

5. The assembly as recited in claim 1, wherein said flap element includes a slotted side and a wing segment, said wing segment received within a slotted side of an adjacent flap assembly.

6. The assembly as recited in claim 2, wherein said seal is disposed on a surface of said plurality of flap assemblies exposed to exhaust gases.

7. An exhaust nozzle assembly cornpnsing:
a plurality of interfitting flap assemblies movable between a maximum area position and a minimum area position, each of said plurality of flap assemblies including a slot on one longitudinal side and a wing on a second longitudinal side, said wing fitting within a slot of an adjacent one of said plurality of interfitting flap assemblies, wherein each of said plurality of flap assemblies includes a divergent element attached to a flap element, said divergent element and said flap element include a portion of said wing; and
a seal disposed between adjacent flap assemblies, said seal includes a notch corresponding to trailing edges of adjacent divergent elements.

8. The assembly as recited in claim 7, wherein said notch is V-shaped.

9. The assembly as recited in claim 7, wherein said seal includes a first surface and a tented surface disposed on a plane different than said first surface, said tented surface extending outward from said first surface.

10. The assembly as recited in claim 1, wherein said wing disposed within an adjacent slot does not contact an interior surface of said adjacent flap assembly.

11. An exhaust nozzle assembly comprising:
a variable opening defining a serrated trailing edge; and
a plurality of flap assemblies including a wing portion disposed along a first longitudinal side and a slot disposed on a second longitudinal side for receiving a wing portion of an adjacent flap assembly and a divergent element that defined a portion of said serrated trailing edge wherein said divergent element comprises a portion of said wing and a portion of said slot, wherein said wing is disposed within a slot of an adjacent divergent element, and said divergent element comprises an aft most segment forming a point of said serrated training edge and an exterior surface extending radially outwardly from said aft most segment.

12. The assembly as recited in claim 11, wherein said plurality of flap assemblies includes a corresponding plurality of flap elements attached to a corresponding plurality of divergent elements.

13. The assembly as recited in claim 12, including a seal disposed on an inner surface of said exhaust nozzle assembly.

14. The assembly as recited in claim 13, wherein said seal includes a notch corresponding to a portion of said serrated trailing edge.

15. The assembly as recited in claim 14, wherein said notch is substantially V-shaped.

16. The assembly as recited in claim 14, wherein said seal includes an angled surface between a substantially planar region and an edge of said notch.

17. The assembly as recited in claim 14, wherein said seal includes a first substantially flat segment and a second tented portion angled outwardly from said first substantially flat segment, and said notch is disposed within said second tented portion.

* * * * *

UNITED STATES PATENT AND TRADEMARK OFFICE
CERTIFICATE OF CORRECTION

PATENT NO. : 7,578,133 B2  
APPLICATION NO. : 11/091120  
DATED : August 25, 2009  
INVENTOR(S) : Arbona et al.

Page 1 of 1

It is certified that error appears in the above-identified patent and that said Letters Patent is hereby corrected as shown below:

Claim 7, Column 5, line 49: "cornprising" should read as --comprising--

Claim 7, Column 6, line 7: insert --wherein-- after "assemblies,"

Claim 11, Column 6, line 25: "defined" should read as --defines--

Claim 11, Column 6, line 30: "training" should read as --trailing--

Signed and Sealed this

Third Day of November, 2009

David J. Kappos
*Director of the United States Patent and Trademark Office*

UNITED STATES PATENT AND TRADEMARK OFFICE
CERTIFICATE OF CORRECTION

PATENT NO. : 7,578,133 B2  Page 1 of 1
APPLICATION NO. : 11/091120
DATED : August 25, 2009
INVENTOR(S) : Arbona et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1179 days.

Signed and Sealed this

Seventh Day of September, 2010

David J. Kappos
*Director of the United States Patent and Trademark Office*